United States Patent
Bernard et al.

(10) Patent No.: US 7,820,325 B2
(45) Date of Patent: Oct. 26, 2010

(54) ALKALINE ELECTROLYTE STORAGE BATTERY HAVING AN ANODE FORMED OF AN ACTIVE MATERIAL COMPOSITION

(75) Inventors: Patrick Bernard, Bordeaux (FR); Bernard Knosp, Bordeaux (FR); Michele Baudry, Eysines (FR)

(73) Assignee: SAFT, Bagnolet (FR)

( * ) Notice: Subject to any disclaimer, the term of this patent is extended or adjusted under 35 U.S.C. 154(b) by 1104 days.

(21) Appl. No.: 11/419,337

(22) Filed: May 19, 2006

(65) Prior Publication Data
US 2006/0269841 A1    Nov. 30, 2006

(30) Foreign Application Priority Data
May 26, 2005    (FR) .................................. 05 05304

(51) Int. Cl.
*H01M 4/46*    (2006.01)
*H01M 4/58*    (2006.01)
*H01M 4/36*    (2006.01)
*C22C 28/00*    (2006.01)

(52) U.S. Cl. .................... 429/218.2; 429/223; 420/416; 420/900

(58) Field of Classification Search ................. 429/218, 429/223, 224, 206, 226; 148/426; 420/416, 420/900
See application file for complete search history.

(56) References Cited

U.S. PATENT DOCUMENTS

| | | | |
|---|---|---|---|
| 211,795 A | 1/1879 | Schoenfeld et al. | |
| 5,547,784 A | 8/1996 | Okawa et al. | |
| 6,214,492 B1 | 4/2001 | Kono et al. | |
| 6,248,475 B1 | 6/2001 | Hayashida et al. | |
| 2003/0129491 A1 | 7/2003 | Magari et al. | |
| 2004/0134569 A1 | 7/2004 | Yasuoka et al. | |
| 2004/0146782 A1 | 7/2004 | Yasuoka et al. | |

FOREIGN PATENT DOCUMENTS

| | | |
|---|---|---|
| EP | 0 273 625 | 7/1988 |
| EP | 0 587 974 A1 | 3/1994 |
| EP | 0 645 833 A1 | 3/1995 |
| EP | 0 696 823 A1 | 2/1996 |
| EP | 0 783 040 A1 | 7/1997 |

(Continued)

OTHER PUBLICATIONS

Machine Translation of JP 2005/032573 A, Takee et al., Feb. 2005.*

(Continued)

*Primary Examiner*—Jonathan Crepeau
*Assistant Examiner*—Kenneth Douyette
(74) *Attorney, Agent, or Firm*—Sughrue Mion, PLLC

(57) ABSTRACT

An active material composition for an alkaline storage battery comprises a) an alloy capable of forming a hydride, of formula $R_{1-y}Mg_yNi_{t-z}M_z$ in which R is La, optionally substituted by Nd and/or Pr, M is at least one element chosen from the group comprising Mn, Fe, Al, Co, Cu, Zr and Sn, in which $0.1 \leq y \leq 0.4$, $3.2 \leq t \leq 3.5$, and $z \leq 0.5$, and of which the equilibrium hydrogen pressure with the alloy, for a hydrogen insertion into the alloy of 0.5 H/Metal at 40°, is less than 0.7 bar, and b) a yttrium-based compound in a mixture with alloy a).

13 Claims, 1 Drawing Sheet

FOREIGN PATENT DOCUMENTS

| | | |
|---|---|---|
| EP | 0 820 109 A1 | 1/1998 |
| EP | 0 945 907 A1 | 9/1999 |
| EP | 1 026 764 A2 | 8/2000 |
| FR | 2835354 | 8/2003 |
| JP | 10-21908 | 1/1998 |
| JP | 200021398 | 1/2000 |
| JP | 2000-340223 | 12/2000 |
| JP | 2001006666 | 1/2001 |
| JP | 2001-316744 | 11/2001 |
| JP | 2001-325957 | 11/2001 |
| JP | 2001316744 | 11/2001 |
| JP | 2002-69554 | 3/2002 |
| JP | 2004-115870 | 4/2004 |
| JP | 2005032573 A * | 2/2005 |

OTHER PUBLICATIONS

Patent Abstracts of Japan, Publication No. -09-194971; Jul. 29, 1997; Japan Steel Works.

Journal of Alloys and Compounds 231 (1992) 598-603); Improvement in Cycle Life Performance of High Capacity Nickel-Metal Hydride Battery; Kaiya, et al.

Reports on Progress in Physics; A Europhysics Journal Published by The Institute of Physics; vol. 45, No. 9, Sep. 1982; Buschow, et al.; "Hydrides Formed From Intermetallic Compounds of Two Transition Metals;: a Special Class of Ternary Alloys".

* cited by examiner

ALKALINE ELECTROLYTE STORAGE BATTERY HAVING AN ANODE FORMED OF AN ACTIVE MATERIAL COMPOSITION

BACKGROUND OF THE INVENTION

The present invention relates to an active material composition comprising an alloy of type $AB_t$ with $3.2 \leq t \leq 3.5$ and a yttrium based composition. The invention also provides an anode comprising said composition, and an alkaline electrolyte storage battery comprising said anode. The said storage battery has improved capacity to volume ratio, greater power and length of life.

STATE-OF-THE-ART

Portable electrical a ad electronic appliances such as for example battery operated tools, have increasing energy requirements. An alkaline storage battery comprising an anode based on a type $AB_5$ hydride double metal and a nickel hydroxide based cathode does not provide a satisfactory response to developments in such energy requirements. In effect, firstly, an alloy of type $AB_5$ has a capacity limited to 300 to 320 mAH/g and secondly, attempts to optimize the power of such a storage battery have shown that it is not possible to increase its power without reducing its volume capacity. Now, certain electrical appliances must be able to furnish high-power for a few minutes, continuously.

With an aim to improving the power of the nickel-metal hydride storage battery, surface treatments of alloys capable of forming a hydride have been disclosed in European patent application 273,625, European patent 645,833, European patent applications 696,823, 820,109 and 945,907. The surface treatments are acid or alkaline etching of the alloy capable of forming a hydride. They have the disadvantage of being expensive and of reducing the capacity of the alloy capable of forming a hydride.

With an aim to improving volume capacity, compounds such as the families of $AB_2$ have been studied. However, even though their initial capacity is greater than that of an $AB_5$ type alloy, their power and length of life are considerably reduced.

An $A_2B_7$ type alloy has recently become available commercially. However, although its initial capacity is greater than that of an $AB_5$ alloy and comparable to that of a $AB_2$ alloy, it has limited length of life.

United States patent application 2004/0134569 discloses an alloy capable of forming a hydride of the $AB_t$ type with $2.8 \leq t \leq 3.9$ storage battery. The formula of this alloy is $Ln_{1-x}Mg_xNi_{y-a}Al_a$, in which Ln is at least one element chosen from rare earths, $0.05 \leq x \leq 0.20$; $2.8 \leq y \leq 3.9$ and $0.10 \leq a \leq 0.25$. It is stated that for the rare earth element there can be used yttrium, scandium or a lanthanide and that when yttrium is employed, the cycling lifetime of the storage battery is improved. However, yttrium is an expensive element.

There is consequently a need for a storage battery that has a small amount of yttrium and which nevertheless has high capacity, power and lifetime under cycling.

SUMMARY OF THE INVENTION

To provide this, the invention discloses an active material composition comprising:
a) an alloy capable of forming a hydride, of formula $R_{1-y}Mg_yNi_{t-z}M_z$ in which
R is La, optionally substituted by Nd and/or Pr.
M is at least one element chosen from the group comprising Mn, Fe, Al, Co, Cu, Zr and Sn.
$0.1 \leq y \leq 0.4$.
$3.2 \leq t \leq 3.5$.
$z \leq 0.5$.
and of which the equilibrium hydrogen pressure with the alloy, for a hydrogen insertion into the alloy of 0.5H/Metal at 40° C. is less than 0.7 bar.
b) a yttrium-based compound in a mixture with alloy a).

An anode comprising this active material composition is also provided

The invention also provides an alkaline electrolyte storage battery comprising said at least one anode.

DETAILED DESCRIPTION OF PREFERRED EMBODIMENTS

Figure 1:
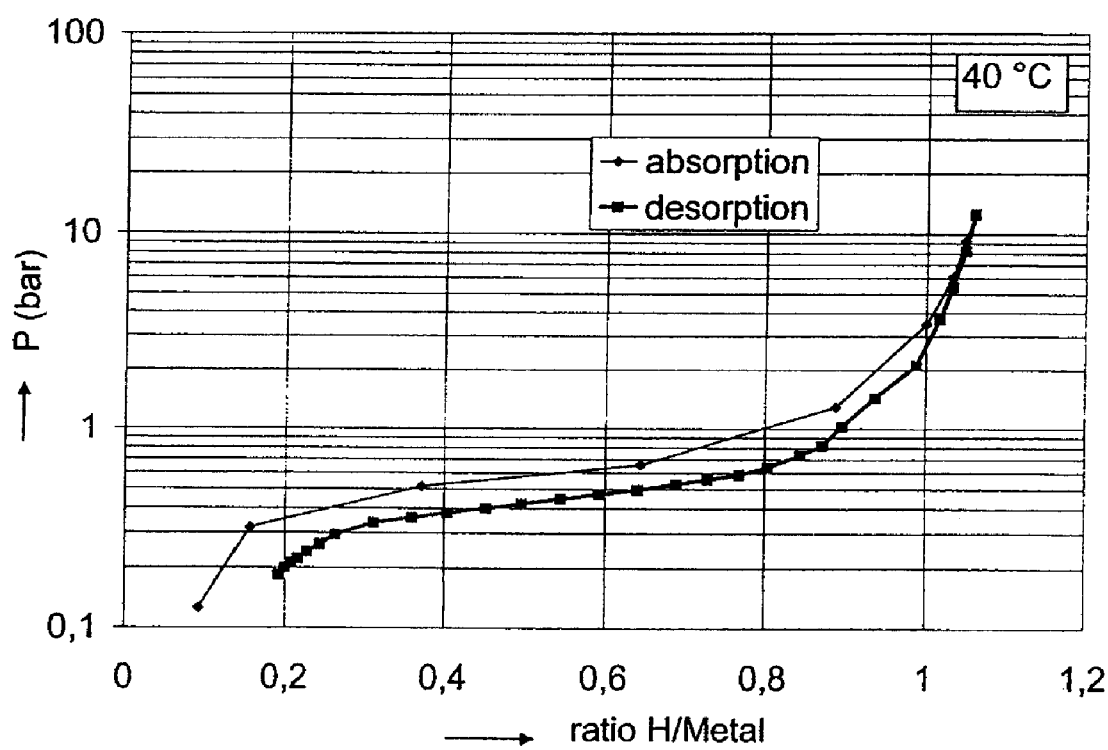
FIG. 1 is a pressure-composition isothermal at 40° C. for an alloy capable of forming a hydride according to the invention.

The composition of active material according to the invention comprises an alloy capable of forming a hydride of formula $R_{1-y}Mg_yNi_{t-z}M_z$ in which
R is La, optionally substituted by Nd and/or Pr.
M is at least one element chosen from the group comprising Mn, Fe, Al, Co, Cu, Zr and Sn, and in which $0.1 \leq y \leq 0.4$.
$3.2 \leq t \leq 3.5$.
$z \leq 0.5$.
Preferably, $3.3 \leq t \leq 3.4$.
Preferably, $0.05 \leq z \leq 0.25$.
Preferably, $0.2 \leq y$ The composition of the alloy can be confirmed by element analysis by the inductive plasma technique or by atomic absorption or by X-ray fluorescence.

The equilibrium hydrogen pressure with the alloy, and insertion of hydrogen into the alloy of 0.5H/metal at 40° C., is lower than 0.7 bar. The H/metal ratio is the ratio between the number of moles of hydrogen atoms inserted in the alloy and the number of moles of metal atoms in the alloy. The term "metal" as used herein means all the metals contained in the alloy, in other words R, Mg, Ni and M.

The equilibrium hydrogen pressure at 40° C. of hydrogen and insertion of 0.58/metal is measured from the curve of the isothermal for insertion of hydrogen by the alloy (FIG. 1). The curve in FIG. 1 shows hydrogen pressure as a function of hydrogen insertion rate in the alloy at 40° C. It was plotted after three cycles of activation (hydrogen absorption and desorption) of the alloy and degasing of residual hydrogen at 80° C.

This curve shows a first low-pressure portion where pressure varies rapidly as a function of hydrogen concentration. Over this portion, the atomic hydrogen is "soluble" in the alloy and progressively diffuses therethrough. This constitutes a solid (unordered) solution of hydrogen in the alloy. The hydride does not yet get formed.

Over a second portion, the curve has a shape of a slightly sloping plateau. The beginning of this plateau marks the beginning of the formation of the hydride (in the hydride, atomic hydrogen occupies the insertion sites in the alloy in an ordered manner). During the plateau phase, the atomic hydrogen progressively occupies all of the insertion sites of the alloy. The end of the plateau corresponds to a situation where practically all the insertion sites of the alloy are occupied by hydrogen.

Over a third portion, hydrogen pressure again increases rapidly with hydrogen concentration and the amount of hydrogen which the alloy can still insert only increases slightly. The alloy is now solely in the form of the hydride in which the excess atomic hydrogen is inserted in unordered fashion. One can determine on the x axis the position of the ratio H/metal equal to 0.5, and deduce therefrom the value of pressure at equilibrium by reading from the y axis the corresponding point on the desorption curve.

Hydrogen desorption occurs at a plateau pressure that is less than the absorption pressure.

The pressure of the hydrogen plateau is not inherent in the composition of the alloy capable of forming a hydride but rather in the composition of the phase that absorbs the hydrogen. Now, for a given alloy composition, differing processing modes, notably differing thermal treatments, can lead to a single-phase or multiphase alloy being obtained, the composition of none of the phases thereof being identical to that of the alloy.

According to a preferred embodiment, hydrogen pressure, for a hydrogen insertion into the alloy of 0.5/Metal is less than 0.45 bar.

Hydrogen pressure less than 0.7 bars of 40° C. is compatible with sealed battery operation.

According to one embodiment, the size of the alloy particles is characterized by a Dv 50% of from 30 to 120 µm, preferably from 50 to 100 µm.

According to another embodiment, particle sizes of the alloy capable of forming a hydride is characterized by a Dv 50% of from 120 to 200 µm.

The effect of mixing the alloy with a yttrium-based compound is to increase the discharge capacity the element is able to restitute. In particular, this effect is also shown in the case of heavy current discharges (discharge at a current of 5 C).

Mixing the alloy with a yttrium-based compound also has the effect of improving the cycling lifetime of the anode.

The yttrium-based compound is selected from a non-exhaustive list comprising a yttrium-based oxide such as $Y_2O_3$, a yttrium based hydroxide such as $Y(OH)_3$ or a yttrium-based salt. Preferably, the yttrium-based compound is yttrium oxide $Y_2O_3$.

The yttrium-based compound is mixed with the alloy in a proportion such that the weight of yttrium makes up from 0.1 to 2% of the alloy weight, preferably from 0.2 to 1% of alloy weight, and even more preferably from 0.2 to 0.7% by weight of the alloy.

The process of adding yttrium-based composition to the active material during production of the anode is simple to carry out on an industrial scale. It does not require the use of complex equipment. Thus as will be observed, the solution according to the invention is effectively very simple and/or does not introduce any notable cost overhead.

The invention also provides an anode comprising said composition of active material.

The anode is produced by pasting a carrier with a paste constituted by an aqueous mixture of the active material composition according to the invention, of additives, of binders and conductive agents.

The carrier can be a nickel foam, a perforated foil that is flat or three-dimensional made of nickel or nickel-plated steel.

The additives are designed to facilitate implementation or performance of the anode. They can be thickeners such as carboxymethylcellulose (CMC), hydroxypropylmethylcellulose (HPMC), poly(acrylic acid) (PAAc), poly(ethyleneoxide) (PEO). They can also be binders such as butadiene-styrene (SBR), polystyrene acrylate (PSA), polytetrafluoroethylene (PTFE). They can also be conductive agents such as nickel powder, carbon fiber powder, nanotubes.

Advantageously, the anode is covered with a surface layer design to improve higher operating current discharge and/or oxygen recombination at the end of charging.

The invention also provides an alkaline electrolyte storage battery comprising at least an anode according to the invention.

This storage battery typically comprises said at least one anode, at least one cathode, at least one separator and an alkaline electrolyte.

The cathode is constituted by the cathodic active mass deposited on a carrier which can be a sintered support, a nickel foam, a plane or three-dimensional perforated foil of nickel or nickel-plated steel.

The cathodic active mass comprises the cathodic active material and additives chosen to facilitate implementation and performance thereof. The cathodic active matter is a nickel hydroxide $Ni(OH)_2$ which can be partially substituted by Co, Mg and Zn. This hydroxide can be coated with a surface layer based on cobalt compounds and can be partially oxidized.

Among the additives, we can mention without this list being exhaustive, carboxymethylcellulose (CMC), hydroxypropylmethylcellulose (HPMC), hydroxypropylcellulose (HPC), hydroxyethylcellulose (HEC), poly(acrylic acid) (PAAc), polystyrene maleic anhydride (SMA), optionally carboxylated butadiene-styrene copolymers (SBR), an acrylonitrile and butadiene copolymer (NBR), a styrene, ethylene, butylene and styrene (SEBS) copolymer, a terpolymer of styrene, butadiene and vinylpyridine (SBVR), polystyrene acrylate (PSA), polytetrafluoroethylene (PTFE), an ethylene and propylene (FEP) fluorinated copolymer, polyhexa-fluoropropylene (PPHF), ethylvinylalcool (EVA), zinc oxide ZnO, fibres (of Ni, C, polymer), powders of cobalt-based compounds such as Co, $Co(OH)_2$, CoO, $Li_xCoO_2$, $H_xCoO_2$, $Na_xCoO_2$.

The separator is generally composed of polyolefin (for example polypropylene) or non-woven porous polyamide fibres.

The electrolyte is a concentrated alkaline aqueous solution comprising at least a hydroxide (KOH, NaOH, LiOH), at a concentration generally of the order of several times normality.

In conventional fashion, the electrode pastes are prepared, the electrodes are made and then at least one cathode, a separator and an anode are placed one on top of the other to constitute the electrochemical unit. This electrochemical unit is introduced into a container and is impregnated with an aqueous alkaline electrolyte. After this, the storage battery is closed.

The invention covers all formats of storage battery: prism-shaped format (flat electrodes) or cylindrical format (spiral or concentric electrodes).

The storage battery of the invention can be of the open type (open, partially open) or of the sealed type.

The storage battery according to the invention is particularly well suited as a source of power for an electric vehicle or a portable appliance.

Further characteristics and advantages of the invention will become more clear from the following examples.

EXAMPLES

The alloys a to j of formula $R_{1-y}Mg_yNi_{t-z}M_z$ of various compositions were produced by a method of fast cooling and annealed at temperatures comprised between 825 and 1,100° C. for durations comprised between 1 hour and 5 hours.

The compositions of the alloys a to j are given in Table 1.

The values of the equilibrium hydrogen pressure with the alloy for 0.5H/metal at 40° C. and values for solid-gas reaction capacity under 10 bars of hydrogen, calculated from the PCT curves, are given for each alloy in Table 1.

The solid-gas reaction capacity indicates the percentage in mass of hydrogen that the alloy can absorb.

TABLE 1

Composition and characteristics of alloys.

| Alloy | La | Ce | (Nd.Pr) | Mg | Ni | Co | Al | Mn | t | Capacity[+] in solid-gas reaction | Plateau pressure (bar) | Electo-chemical capacity (mAh/g)[**] |
|---|---|---|---|---|---|---|---|---|---|---|---|---|
| $AB_5$ (reference) | 0.32 | 0.48 | 0.20 |  | 3.60 | 0.70 | 0.3 | 0.4 | 5.02 | 1.25 | 0.45 | 295 |
| a | 0.7 |  | 0 | 0.3 | 2.80 | 0.50 | 0 | 0 | 3.30 | 1.50 | <0.2 | 360 |
| b | 0.71 |  | 0 | 0.29 | 2.85 | 0.50 | 0 | 0 | 3.35 | 1.51 | 0.21 | 368 |
| c | 0.70 |  | 0 | 0.30 | 3.28 | 0 | 0 | 0 | 3.28 | 1.47 | 0.27 | 362 |
| d | 0.71 |  | 0 | 0.29 | 3.44 | 0 | 0 | 0 | 3.44 | 1.54 | 0.43 | 358 |
| e | 0 |  | 0.70 | 0.30 | 3.27 | 0 | 0 | 0 | 3.27 | 1.26 | 3.8 | not measured |
| f | 0.42 |  | 0.30 | 0.29 | 3.32 | 0 | 0 | 0 | 3.32 | 1.48 | 0.81 | 124 |
| g | 0.42 |  | 0.30 | 0.29 | 3.10 | 0 | 0 | 0.25 | 3.35 | 1.43 | <0.2 | 336 |
| h | 0.42 |  | 0.30 | 0.29 | 3.10 | 0 | 0.25 | 0 | 3.35 | 1.23 | 0.26 | 287 |
| i | 0.55 |  | 0.15 | 0.29 | 3.44 | 0 | 0 | 0.05 | 3.49 | 1.5 | 0.72 | 89 |
| j | 0.65 |  | 0.05 | 0.29 | 3.20 | 0 | 0 | 0 | 3.20 | 1.42 | <0.2 | 371 |

[+]Capacity under 10 Bar $H_2$ expressed in wt. %
[*] Hydrogen equilibrium pressure in desorption at 40° C. and 0.5 H/M
[**]Capacity measured at cycle 3

Table 1 shows that alloy e, in which lanthane was totally replaced by Nd and Pr (with Nd/Pr close to 3), has a desorption plateau pressure of 3.8 bar at 40° C., which is incompatible with sealed operation. In effect, in a storage battery supplying high power, the current and consequently Joule effect is elevated which leads to the temperature of the storage battery being greater than 40° C. If the hydrogen pressure is 3.8 bar, the internal pressure inside the storage battery will be high, leading to the safety valve of the battery container opening with premature leakage.

The solid-gas reaction capacity of alloys a, b, c, d, g, h and j according to the invention is on average 1.44%. This represents an increase of around 15% compared to the solid-gas reaction capacity of the $AB_5$ alloy, acting as a reference, which is only 1.25%.

In a first series of tests, the mass electrochemical capacities of the alloys a to j were measured. The mass capacity of the alloys was determined on a laboratory prismatic element the capacity of which was limited by the anode.

Anodes comprising the alloys a to j were produced. They were constituted by:
  65% (by weight) of alloy reduced to powder the particle size of which was characterized by a $D_v50\%$ corresponding to a size of 32 µm.
  30% (by weight) of nickel powder by way of conductive compound
  −5% PTFE as a binder.

The cathode comprised a current collector of the standard nickel foam type and an active matter constituted by a nickel hydroxide partially substituted by Zn and Co the conductive network constituted of $Co(OH)_2$ of which was formed in advance.

The anode and cathode were separated by a polyolefin separator and a membrane designed to prevent possible recombination of oxygen discharged at the cathode on the anode. During the activation period, the alloy was cycled under the following conditions:
  16 hours charge at 30 mA/g
  1 hour's rest
  discharge at 60 mA/g, down to 0.9 V.

The discharge capacities at cycle 3 using the various alloys are summarized in Table 1.

Taking account of the high hydrogen pressure, alloy e was not evaluated.

The study of this table shows clearly that the alloys for which the desorption pressure for 0.5H/metal at 40° C. was higher than 0.7 bar (alloys f and i), have very low electrochemical capacities, lower than 150 mAh/g.

The alloys a, b, c, d, g, h and j according to the invention, the desorption pressure of which for 0.5H/metal at 40° C. was less than 0.7 bar, had an average electrochemical capacity of around 350 mAh/g. This represents an improvement in electrochemical capacity of 18% over the electrochemical capacity of the reference $AB_5$ alloy, which was only 295 mAh/g.

It will be seen from Table 1 that the alloys c, d, g, h and j which did not include cobalt did nevertheless have a capacity comparable to that of alloys a and b which included cobalt. One supplementary advantage of the invention is consequently that of providing an alloy able to form a hydride, not including cobalt, having high capacity. In effect, cobalt has the disadvantage of being an expensive element.

In a second series of tests, sealed storage batteries comprising an anode comprising the alloys b, c, d, g and j were formed. The storage batteries had a cylindrical Cs (or Sub C) format corresponding to an outside diameter of around 22.5 mm and a height of around 43 mm. The capacity of the storage batteries was 3.2 Ah.

The paste for the anode was constituted by an aqueous mixture of the alloy powder according to the invention in a proportion greater than 98% by weight, of CMC (thickener), of SBR (binder) and of carbon (conductor). All electrodes were cut out to the same dimensions.

The yttrium-based compound was added in the form of yttrium oxide $Y_2O_3$ in a weight proportion of 0.5% yttrium with respect to the weight of alloy.

The cathode was a standard nickel foam electrode containing a nickel based hydroxide and $Co(OH)_2$ as conductive compound.

The electrochemical unit constituted by the cathode, separator and anode was wound into a spiral and introduced into a container. The electrical connection elements were then assembled. The unit was impregnated with 9N electrolyte consisting of a ternary mixture of KOH, NaOH and LiOH.

The storage batteries first underwent three cycles consisting of:
  a 16 hour charge at 0.3 A,
  1 hour's rest,
  discharge at 0.6 A, down to 0.9 V.

Measurements of performance under discharge at a current of C and of 15 A were then performed in the following manner: the batteries were charged at C/10 for 16 hours, and then were discharged at currents of C and 15 A down to a voltage of 0.9 V. Discharge capacities were measured. They are given in Table 2. This table shows that storage battery 4 the anode of which comprised an alloy according to the invention but without yttrium oxide had a capacity less than 3 Ah at a current of C and less than 2.9 Ah at a current of 50 A (equivalent to around 5 times C), compared to batteries 2, 3, 5, 6, 7, 8 and 9 the anode of which did contain the alloy of the invention and yttrium oxide.

TABLE 2

Discharge capacity for different discharge currents

| | Battery No. | | | | | | | | |
|---|---|---|---|---|---|---|---|---|---|
| | 1 | 2 | 3 | 4 | 5 | 6 | 7 | 8 | 9 |
| Alloy | $AB_5$ | b | c | c | c | c | d | g | j |
| $Y_2O_3$ (Y/Alloy = 0.5 wt. %) | yes | yes | yes | non | yes | yes | yes | yes | yes |
| Dv50% (μm) | 32 | 32 | 32 | 32 | 65 | 150 | 32 | 32 | 32 |
| Discharge capacity at a current of C (Ah) | 3.15 | 3.23 | 3.20 | 2.88 | 3.22 | 3.17 | 3.27 | 3.15 | 3.24 |
| Discharge capacity at a current of 15 A (Ah) | 2.81 | 3.06 | 2.98 | 2.57 | 2.97 | 2.70 | 3.04 | 2.94 | 3.03 |

Finally, these elements of format Cs underwent prolonged cycling constituted by:
 a charge for 2 h 45 min at a current of C/3,
 15 minutes rest,
 discharge at a current of C down to a voltage of 0.9 V, and
 30 minutes rest.
Periodically, capacity was measured during a reference cycle consisting of:
 16 h charge at C/10,
 1 hour's rest,
 discharge at a current of C/5 down to a voltage of 0.9 V.
Lifetime corresponding to a loss of capacity of 20% was determined, the results are given in Table 3.

TABLE 3

Lifetime corresponding to a 20% loss of capacity

| | Battery No. | | | | | | | | |
|---|---|---|---|---|---|---|---|---|---|
| | 1 | 2 | 3 | 4 | 5 | 6 | 7 | 8 | 9 |
| Alloy | $AB_5$ | b | c | c | c | c | d | g | j |
| $Y_2O_3$ (Y/Alloy = 0.5% wt.) | yes | yes | yes | no | yes | yes | yes | yes | yes |
| Dv 50% (μm) | 32 | 32 | 32 | 32 | 65 | 150 | 32 | 32 | 32 |
| Lifetime(cycles) | 32 | 288 | 308 | 147 | 347 | 372 | 283 | 312 | 292 |

The very low lifetime of this storage battery comprising an alloy of type $AB_5$ will be noted. Further, when the anode does not contain yttrium, it will be observed that the lifetime is reduced compared to storage batteries the anode of which does contain yttrium oxide. Finally, note there is an improvement in lifetime when particle size (Dv50%) goes up from 32 μm to 65 μm and then to 150 μm. Nevertheless, as table 2 shows, storage battery 6 the anode of which comprised an alloy of particle size 150 μm and yttrium oxide did have a capacity that was below 2.9 Ah at 15 A current.

These examples should be considered as having been given by way of non-limiting illustration, and the invention should not be considered as being limited to the details given here but can be modified while remaining within the scope of the attached claims.

The invention claimed is:

1. An alkaline electrolyte storage battery comprising at least one anode that comprises an active material composition comprising:
 a) an alloy capable of forming a hydride, of formula $R_{1-y}Mg_yNi_{t-z}M_Z$ in which
  R is La, optionally substituted by Nd and/or Pr,
  M is at least one element chosen from the group comprising Mn, Fe, Al, Co, Cu, Zr and Sn,
  $0.1 \leq y \leq 0.4$,
  $3.2 \leq t \leq 3.5$,
  $z \leq 0.5$,
  and of which the equilibrium hydrogen pressure with the alloy, for a hydrogen insertion into the alloy of 0.5H/Metal at 40° C. is less than 0.7 bar;
 b) a yttrium-based compound in a mixture with alloy a).

2. The alkaline electrolyte storage battery according to claim 1, wherein $3.3 \leq t \leq 3.4$.

3. The alkaline electrolyte storage battery according to claim 1, wherein $0.05 \leq z \leq 0.25$.

4. The alkaline electrolyte storage battery according to claim 1, wherein $0.2 \leq y$.

5. The alkaline electrolyte storage battery according to claim 1, wherein the equilibrium hydrogen pressure is less than 0.45 bar.

6. The alkaline electrolyte storage battery according to claim 1, wherein the weight of yttrium makes up from 0.1 to 2% of the weight of said alloy.

7. The alkaline electrolyte storage battery according to claim 1, wherein the weight of yttrium makes up from 0.2 to 1% of the weight of said alloy.

8. The alkaline electrolyte storage battery according to claim 1, wherein the weight of yttrium makes up from 0.2 to 0.7% of the weight of said alloy.

9. The alkaline electrolyte storage battery according to claim 1, wherein the yttrium-based compound is selected from the group comprising a yttrium oxide, hydroxide or a yttrium-based salt.

10. The alkaline electrolyte storage battery according to claim 1, wherein the yttrium-based compound is yttrium oxide $Y_2O_3$.

11. The alkaline electrolyte storage battery according to claim 1, wherein particle sizes of the alloy capable of forming a hydride is characterized by a Dv 50% of from 30 to 120 μm.

12. The alkaline electrolyte storage battery according to claim 1, wherein particle sizes of the alloy capable of forming a hydride is characterized by a Dv 50% of from 120 to 200 μm.

13. The alkaline electrolyte storage battery according to claim 1, wherein particle sizes of the alloy capable of forming a hydride is characterized by a Dv 50% of from 50 to 100 μm.

* * * * *